UNITED STATES PATENT OFFICE.

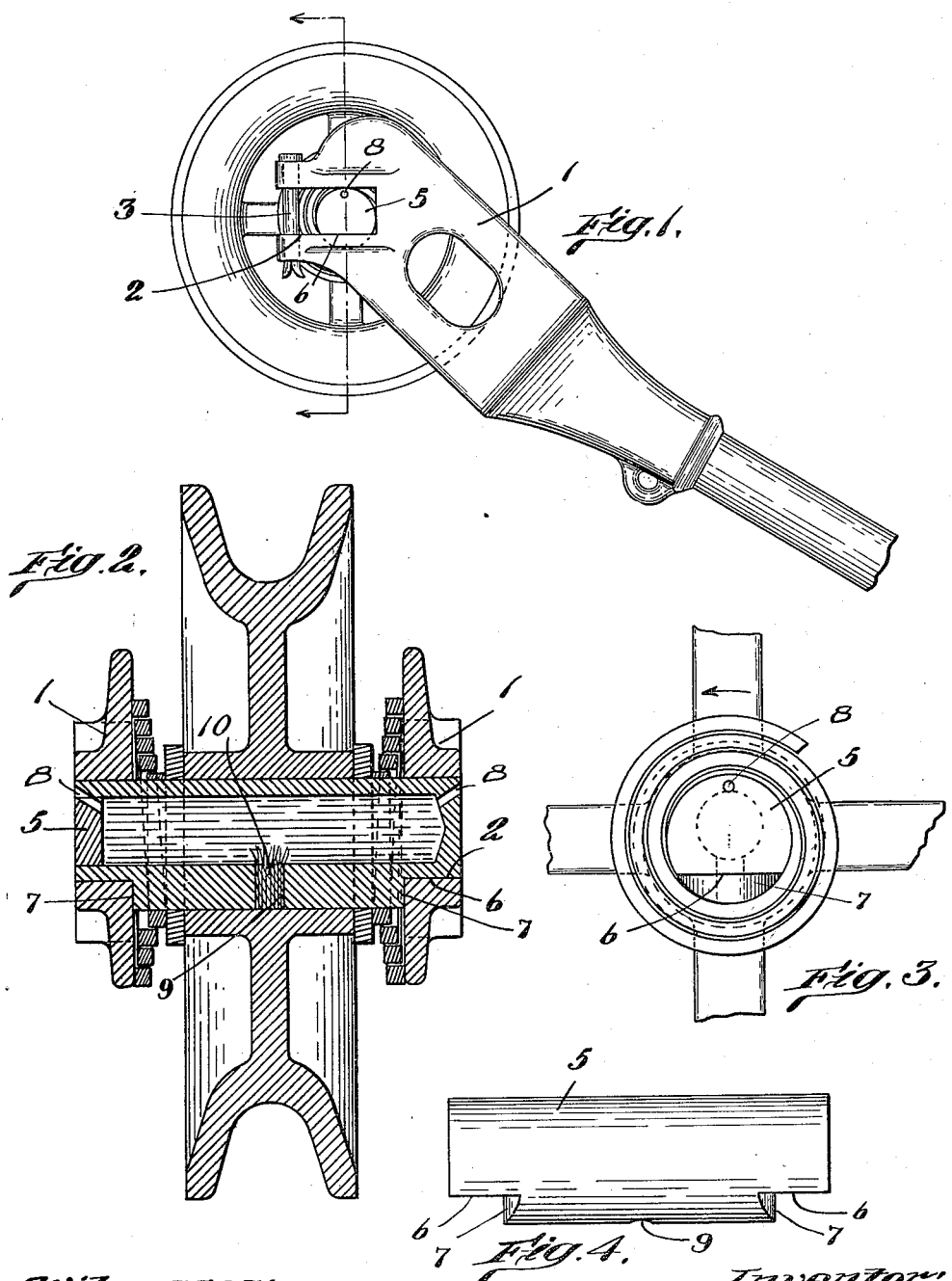

JULIAN WILDER, OF AUGUSTA, MAINE.

TROLLEY-WHEEL MOUNT.

1,130,360. Specification of Letters Patent. Patented Mar. 2, 1915.

Application filed September 28, 1914. Serial No. 864,008.

*To all whom it may concern:*

Be it known that I, JULIAN WILDER, a citizen of the United States, residing at Augusta, in the county of Kennebec and State of Maine, have invented an Improvement in Trolley-Wheel Mounts, of which the following is a specification.

This invention relates to supporting-means or mounts for trolley-wheels, and has for its object the construction of an improved form of axle for the wheel, having special provision for oiling the wheel; also the provision of improved means for holding the wheel on the axle at a point intermediate its length, permitting movement thereof longitudinally on the axle, in both directions, as occasion may require.

Figure 1, is a side elevation of a trolley-wheel and mount embodying this invention. Fig. 2, is a vertical section of the same. Fig. 3, is a detail view of one of the holding springs for the trolley-wheel. Fig. 4, is a detail view of the axle.

The trolley-harp 1, has elongated slots 2, to receive the ends of the trolley-wheel axle, and said slots have open ends which are closed by removable pins 3, permitting removal of the axle 5. Said axle 5 is of cylindrical form and made long enough to extend from side to side of the harp and its end-portions to enter and preferably extend through the elongated slots 2, at least far enough, so that both ends of the axle are exposed at the outer sides of the harp. Said axle is arranged to be held against rotation and longitudinal movement, and is permitted to move angularly with respect to the harp, and, as here shown, its end-portions are slabbed off or recessed on one side to form flat bearing-surfaces 6 for engagement with the bottom walls of the slots, thereby preventing rotation of the axle, and to form shoulders 7 for engagement with the side portions of the harp, adjacent said slots, thereby to prevent longitudinal movement of the axle; and said shoulders are curved longitudinally or in a direction transverse the axle, thus permitting angular movements of the axle with respect to the harp. Said cylindrical axle 5 is made hollow to form a large oil well, and at one or both ends a small oil-hole 8, 8, is formed, by which access may be had to said well, and, at a point intermediate the length of the axle a hole 9 is formed, leading from the well, which contains a wick 10. The oil-holes 8, 8, at the ends of the axle are exposed at the sides of the harp, so that oil may be easily and quickly supplied, and said holes are permitted at such exposed points by recessing or slabbing off only one side of the axle. Heretofore both sides of the axle have been recessed or slabbed off, and much difficulty was encountered in supplying oil through small orifices arranged at a center of the axle and disposed horizontally. The oil well may be produced by drilling a large hole into one end of the axle, for nearly its entire length, and then closing the end of said hole by a cylindrical plug; and then the several oil-holes are drilled. The oil-holes, here shown at the ends of the axle, are arranged, it will be observed, at the top of the axle, and extended downward in an oblique direction, into open communication with the oil well, so that the oil flows by gravity down through said holes into the well.

The trolley-wheel which is arranged on the axle is of any usual or suitable construction. The means herein provided for holding said wheel in a middle position on the axle, yet permitting movement thereof in each direction from the middle, and for conducting the current to the harp, said means comprises a pair of springs, which are arranged between the side walls or cheek-pieces of the harp and the trolley-wheel, with washers interposed between the inner ends of the springs and the ends of the hub of the wheel. The ends of the wheel-hub are made flat, and flat washers are employed, which are made of a considerable thickness to provide for great wear, but an important feature of novelty herein is the construction of these holding-springs. These springs are of the volute type, and arranged with their ends of largest diameter bearing against the side walls or cheek-pieces of the harp, and their ends of smallest diameter bearing against the washers, and the center-holes of the springs are of a diameter sufficient to permit of the axle extending through them. These springs are normally more or less compressed, when the trolley-wheel is in its middle position, thereby exerting upon said wheel a force tending to hold it in such position. As the trolley-wheel is moved angularly with respect to the harp or longitudinally on the axle, these springs are further compressed, and being of the volute type, may be compressed until flattened, in which position they still serve as washers. These springs do not rotate or at least they are not intended to rotate, yet they are so constructed that if rotated, they will not become injured. In view of the fact that these springs do not or are not intended to rotate, and that the washers may or may not rotate, but in practice usually do rotate, by reason of their frictional engagement with the wheel, there is considerable wear on the springs, which increases according to the pressure which they exert. The wheel will be held in its middle position by volute springs made of round wire, and the life of the springs is quite long in so far as exerting their pressures upon the wheel is concerned, but as said springs are used to carry the current, and as the cross sectional area of round wire is rapidly reduced on account of wear, the life of the springs is really shortened to a great extent, and herein said springs are made of wire or a strip of metal which is quadrangular in cross section. A wire or strip of this form presents flat sides or faces for engagement with the washers and with the walls of the harp, and will wear away slowly by frictional engagement therewith, and as they wear away the cross-sectional area will not be rapidly reduced. Thus, for the purposes herein described, springs made of wire or equivalent, which is quadrangular in cross-section, are much more durable than when made of round wire, and their efficiency is also increased.

I claim:—

1. The combination with a trolley-harp having elongated slots, an axle for a trolley-wheel having its end-portions arranged in said slots, said axle having recesses with shoulders at their under sides preventing its rotary and longitudinal movement, but permitting angular movement with respect to the harp, said axle being made hollow to form a large oil-well and having an orifice leading from said well at a point intermediate its length, preferably containing a wick and having an orifice at one end of the axle, at the top, which extends obliquely downward into open communication with the well, and a trolley wheel arranged on said axle, substantially as described.

2. The combination with a trolley-harp having elongated slots, an axle for a trolley-wheel arranged in said slots and movable angularly therein and held against longitudinal and rotary movements, a trolley-wheel mounted on said axle, and volute springs arranged on the axle between said wheel and the side walls of the harp, said springs being normally held under compression to hold said wheel in a middle position on the axle, yet yieldable to permit longitudinal movements of the wheel on the axle, substantially as described.

3. The combination with a trolley-harp having elongated slots, an axle for a trolley-wheel arranged in said slots and movable angularly therein and held against longitudinal and rotary movements, a trolley-wheel mounted on said axle, and volute springs arranged on the axle between said wheel and the side walls of the harp, said springs being composed of strips of wire, quadrangular in cross-section, substantially as described.

4. The combination with a trolley-harp having elongated slots, an axle for a trolley-wheel arranged in said slots and movable angularly therein and held against longitudinal and rotary movements, a trolley-wheel mounted on said axle, and volute springs arranged on the axle between said wheel and the side walls of the harp, said springs being composed of strips of wire having flat sides, substantially as described.

In testimony whereof, I have signed my name to this specification, in the presence of two subscribing witnesses.

JULIAN WILDER.

Witnesses:
E. E. NEWBERT.
E. M. KNOWLES.